(12) United States Patent
Maeda et al.

(10) Patent No.: US 10,870,334 B2
(45) Date of Patent: Dec. 22, 2020

(54) IONIC WIND DELIVERY DEVICE

(71) Applicants: DENSO CORPORATION, Kariya (JP); SOKEN, INC., Nishio (JP)

(72) Inventors: Noboru Maeda, Nishio (JP); Koji Ito, Kariya (JP)

(73) Assignees: DENSO CORPORATION, Kariya (JP); SOKEN, INC., Nisshin (JP)

( * ) Notice: Subject to any disclaimer, the term of this patent is extended or adjusted under 35 U.S.C. 154(b) by 472 days.

(21) Appl. No.: 15/743,829

(22) PCT Filed: Jul. 28, 2016

(86) PCT No.: PCT/JP2016/072186
§ 371 (c)(1),
(2) Date: Jan. 11, 2018

(87) PCT Pub. No.: WO2017/029962
PCT Pub. Date: Feb. 23, 2017

(65) Prior Publication Data
US 2018/0201100 A1    Jul. 19, 2018

(30) Foreign Application Priority Data
Aug. 19, 2015 (JP) .................. 2015-162069

(51) Int. Cl.
*B60H 3/00* (2006.01)
*F24F 13/06* (2006.01)
(Continued)

(52) U.S. Cl.
CPC ............. *B60H 3/0071* (2013.01); *B03C 3/68* (2013.01); *B60H 1/00742* (2013.01);
(Continued)

(58) Field of Classification Search
CPC .. B03C 3/00; B03C 3/025; B03C 3/12; B03C 3/66; B03C 3/68; B60H 3/0071;
(Continued)

(56) References Cited

U.S. PATENT DOCUMENTS 3,054,553 A * 9/1962 White ................... F04F 7/00
                                                315/111.91
4,643,745 A * 2/1987 Sakakibara ............... B03C 3/12
                                                96/76
(Continued)

FOREIGN PATENT DOCUMENTS

JP    S50075104 U   7/1975
JP    H06035433 Y2  7/1994
(Continued)

OTHER PUBLICATIONS

Translation of WO 2012/081704. Jun. 21, 2012. (Year: 2012).*
(Continued)

*Primary Examiner* — Jared Fureman
*Assistant Examiner* — Christopher J Clark
(74) *Attorney, Agent, or Firm* — Harness, Dickey & Pierce, P.L.C.

(57) ABSTRACT

An ionic wind delivery device includes a first discharge electrode; a reference electrode arranged separate from the first discharge electrode; a first power supply circuit configured to output a voltage to induce a corona discharge between the first discharge electrode and the reference electrode; a control electrode arranged on a delivery path of an ionic wind of ions that are generated by the corona discharge induced between the first discharge electrode and the reference electrode; a second discharge electrode arranged between the reference electrode and the control electrode; and a second power supply circuit configured to output a voltage to accelerate the ions generated by the
(Continued)

corona discharge induced between the first discharge electrode and the reference electrode and to induce a corona discharge between the second discharge electrode and the control electrode.

11 Claims, 11 Drawing Sheets

(51) Int. Cl.
  *H01T 19/04* (2006.01)
  *H01T 23/00* (2006.01)
  *B60H 1/00* (2006.01)
  *B03C 3/68* (2006.01)
  *F24F 3/16* (2006.01)

(52) U.S. Cl.
  CPC .............. *F24F 13/06* (2013.01); *H01T 19/04* (2013.01); *H01T 23/00* (2013.01); *F24F 2003/1682* (2013.01); *F24F 2013/0612* (2013.01)

(58) Field of Classification Search
  CPC ... F24F 3/166; F24F 2003/1682; H01T 19/04; H01T 23/00
  See application file for complete search history.

(56) References Cited

U.S. PATENT DOCUMENTS

| | | | |
|---|---|---|---|
| 4,689,056 A * | 8/1987 | Noguchi | B03C 3/12 96/79 |
| 7,911,146 B2 | 3/2011 | Dunn-Rankin et al. | |
| 10,211,036 B2 * | 2/2019 | Maeda | F04D 33/00 |
| 2004/0212329 A1 * | 10/2004 | Krichtafovitch | H05H 1/48 315/500 |
| 2015/0192508 A1 * | 7/2015 | Janka | B03C 3/47 250/282 |

FOREIGN PATENT DOCUMENTS

| | | | | |
|---|---|---|---|---|
| JP | 2004055351 A | | 2/2004 | |
| WO | WO-1988005972 A1 | | 8/1988 | |
| WO | WO-2012081704 A1 * | | 6/2012 | ........... B64C 23/005 |

OTHER PUBLICATIONS

G.D. Conanan et al., "Performance Enhancement of Two-Stage Corona Wind Generator in a Circular Pipe", Proc. 2012 Joint Electrostatics Conference.

* cited by examiner

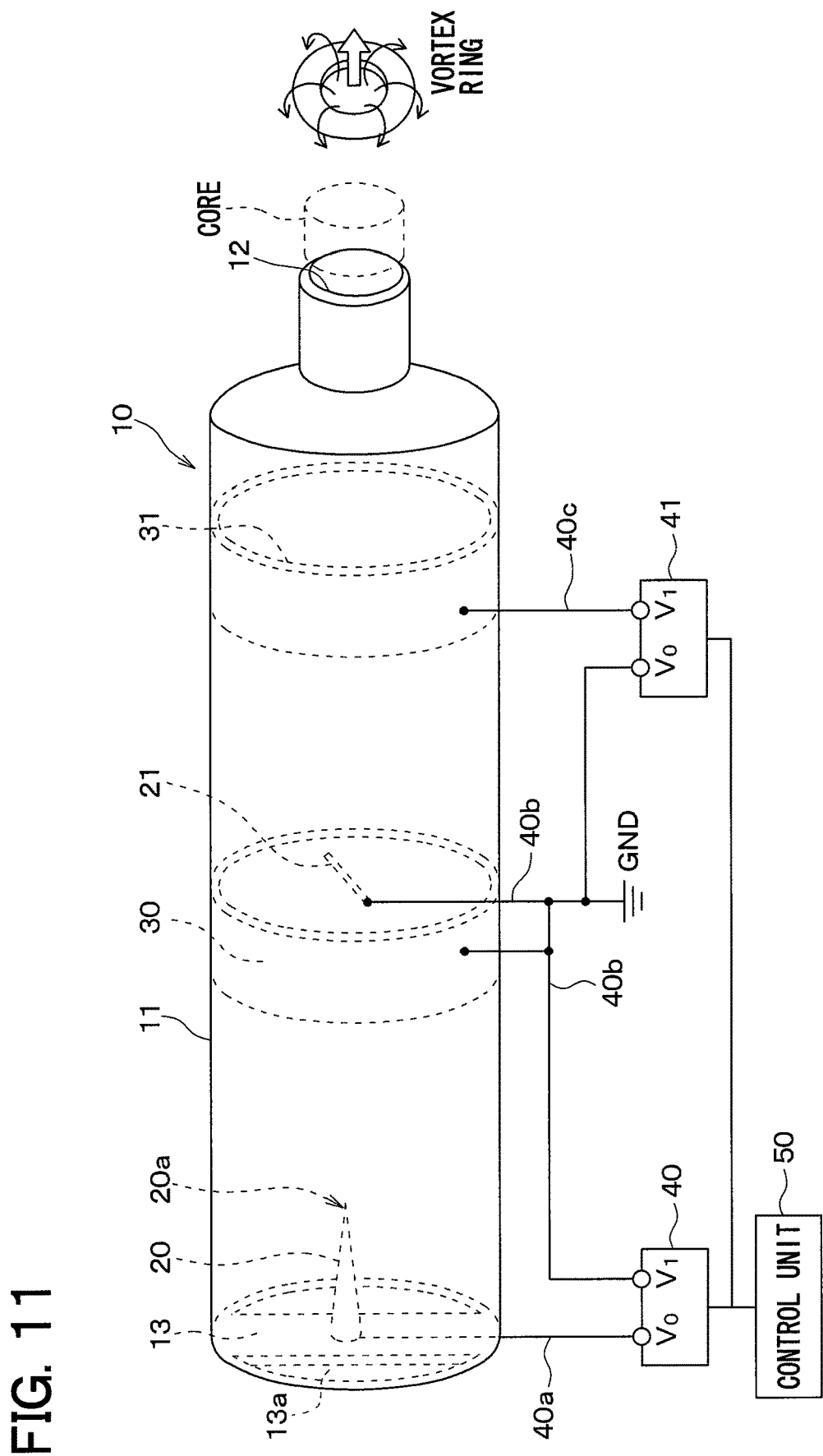

US 10,870,334 B2

IONIC WIND DELIVERY DEVICE

CROSS REFERENCE TO RELATED APPLICATIONS

This application is a U.S. National Phase Application under 35 U.S.C. 371 of International Application No. PCT/JP2016/072186 filed on Jul. 28, 2016 and published in Japanese as WO 2017/029962 A1 on Feb. 23, 2017. This application is based on and claims the benefit of priority from Japanese Patent Application No. 2015-162069 filed on Aug. 19, 2015. The entire disclosures of all of the above applications are incorporated herein by reference.

TECHNICAL FIELD

The present disclosure relates to an ionic wind delivery device that deliveries an ionic wind.

BACKGROUND ART

Patent Literature 1 discloses an ionic wind delivery device that emits a jet of an ionic wind from a jet opening of a case to the outside of a case. In the ionic wind delivery device, the case has an air introducing opening on an end, and an air jet opening on the other end. Multiple electrode pairs, each including a needle-like discharge electrode and a tubular reference electrode, are arranged in series inside of the case. An ionic wind is generated as corona discharge continuously occurs between the discharge electrodes and the reference electrodes of the respective electrode pairs. The ionic wind is emitted out as a jet stream to the outside of the case from the jet opening.

PRIOR ART LITERATURE

Patent Literature

Patent Literature 1: U.S. Pat. No. 7,911,146 B2

SUMMARY OF INVENTION

In the device disclosed in the Patent Literature 1, each of the discharge electrodes has a negative electric potential, and each of the reference electrodes is grounded. Therefore, the electric field is reversed in between the electrode pairs, such as between the electrode pair on the first stage and the electrode pair on the second stage, or between the electrode pair on the second stage and the electrode pair on the third stage. As a result, acceleration of ions is disturbed, and thus it is difficult to favorably accelerate the ionic wind.

It is an object of the present disclosure to provide an ionic wind delivery device capable of further accelerating an ionic wind.

According to an aspect of the present disclosure, an ionic wind delivery device includes: a first discharge electrode; a reference electrode arranged separate from the first discharge electrode; a first power supply circuit configured to generate a voltage to induce a corona discharge between the first discharge electrode and the reference electrode; a control electrode arranged on a delivery path of an ionic wind of ions generated by the corona discharge induced between the first discharge electrode and the reference electrode; a second discharge electrode arranged between the reference electrode and the control electrode; and a second power supply circuit configured to output a voltage that accelerates the ions generated by the corona discharge induced between the first discharge electrode and the reference electrode, and induces corona discharge between the second discharge electrode and the control electrode.

In such a configuration, the control electrode is arranged on the delivery path of the ionic wind of ions generated by the corona discharge induced between the first discharge electrode and the reference electrode. By the second power supply circuit, the ions generated by the corona discharge induced between the first discharge electrode and the reference electrode are accelerated, as well as the ions are added to the accelerated ions due to the corona discharge induced between the second discharge electrode and the control electrode. Accordingly, the ionic wind can be further accelerated.

BRIEF DESCRIPTION OF DRAWINGS

FIG. 11 is a diagram for explaining a modification.

DESCRIPTION OF EMBODIMENTS

Figure 1:
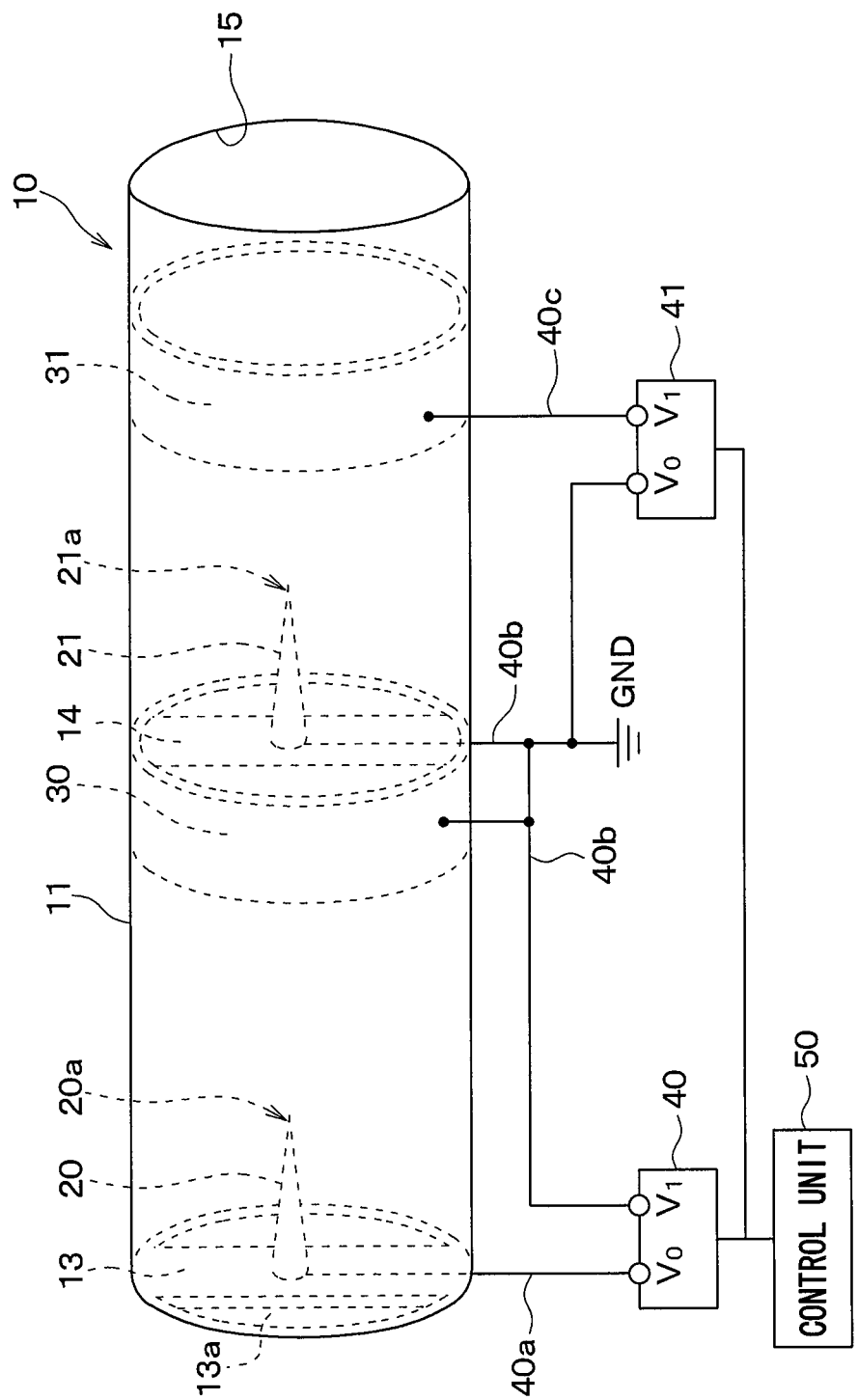
FIG. 1 is a diagram illustrating a structure of an ionic wind delivery device according to a first embodiment.

Hereinafter, embodiments of the present disclosure will be described with reference to the drawings. Portions that are the same or equivalent in the respective embodiments are shown with the same reference numbers in the drawings.

First Embodiment

A structure of an ionic wind delivery device according to a first embodiment is shown in FIG. 1. The ionic wind delivery device is attached to a meter device or the like of a vehicle to emit a jet stream and deliver an air vortex ring toward a passenger's face of the vehicle, to thereby enhance comfort.

The ionic wind delivery device includes a case 10, a first discharge electrode 20, a reference electrode 30, a second discharge electrode 21, a control electrode 31, a power supply circuit 40, a power supply circuit 41, and a control unit 50. In FIG. 1, the case 10 is illustrated as transparent so as to show the interior of the case 10.

The case 10 accommodates the first discharge electrode 20, the reference electrode 30, the second discharge electrode 21 and the control electrode 31 therein. The case 10 has a hollow cylindrical body portion 11 and a support portion 13. The body portion 11 and the support portion 13 are provided by insulating members.

The body portion 11 is formed with an opening 13a for drawing air outside of the case 10 into the case 10 and the support portion 13 for supporting the first discharge electrode 20, at an end in a longitudinal direction of the body portion 11. The body portion 11 is formed with an opening 15 at the other end in the longitudinal direction. Also, the control electrode 31, which is made of a conductive metal, is disposed at the other end of the body portion 11. The reference electrode 30 is disposed between the first discharge electrode 20 and the control electrode 31.

The first discharge electrode 20 has a needle-shaped end portion 20a. The first discharge electrode 20 is a member made of a conductive metal (for example, copper). The first discharge electrode 20 is supported by the support portion 13 so that the end portion 20a is located on an inner side of the case 10. An insulating member, which is not shown, is provided between the first discharge electrode 20 and the case 10 to insulate the first discharge electrode 20 and the case 10 from each other.

The reference electrode 30 has a hollow cylindrical shape. The reference electrode 30 is arranged inside of the case 10 so that an outer surface of the reference electrode 30 is in contact with an inner surface of the case 10.

The power supply circuit 40 serves as a first power supply circuit that generates an output voltage to control a potential difference between the first discharge electrode 20 and the reference electrode 30. The power supply circuit 40 includes a first output terminal $V_0$ and a second output terminal $V_1$. The first output terminal $V_0$ of the power supply circuit 40 is connected to the first discharge electrode 20 through a wiring 40a. The second output terminal $V_1$ of the power supply circuit 40 is connected to the reference electrode 30 and a ground terminal GND through a wiring 40b. The power supply circuit 40 can generate not only an output voltage of equal to or greater than −3 kV and equal to or less than 3 kV, but also an output voltage of −3 kV or less and an output voltage of 3 kV or more. Also, the power supply circuit 40 can output a voltage having a rectangular waveform.

The second discharge electrode 21 has a needle-shaped end portion 20a. The second discharge electrode 21 is a member made of a conductive metal (for example, copper). A support portion 14 for supporting the second discharge electrode 21 is formed inside of the reference electrode 30 having the hollow cylindrical shape. The second discharge electrode 21 is supported by the support portion 14 formed inside of the reference electrode 30. Since the second discharge electrode 21 is connected to the reference electrode 30, the second discharge electrode 21 and the reference electrode 30 have the same potential.

The control electrode 31 has a hollow cylindrical shape. The control electrode 31 is a member made of a conductive metal (for example, copper). The reference electrode 30 is arranged inside of the case 10 so that an outer surface of the reference electrode 30 is in contact with an inner surface of the case 10. The control electrode 31 serves as a first control electrode that is arranged on a delivery path of an ionic wind of ions generated by corona discharge induced between the first discharge electrode 20 and the reference electrode 30 flows.

The power supply circuit 41 serves as a second power supply circuit that generates an output voltage to control a potential difference between the second discharge electrode 21 and reference electrode 30 and the control electrode 31. The power supply circuit 41 has a first output terminal $V_0$ and a second output terminal $V_1$. The first output terminal $V_0$ of the power supply circuit 41 is connected, through a wiring 40b, to the second discharge electrode 21, the reference electrode 30, the second output terminal $V_1$ of the power supply circuit 4, and the ground terminal. The second output terminal $V_1$ of the power supply circuit 41 is connected to the control electrode 31 through a wiring 40c. The second output terminal $V_1$ and the case 10 are insulated from each other, and the first output terminal $V_0$ and the case 10 are insulated from each other.

The power supply circuit 41 can generate an output voltage of 6 kV or less. The power supply circuit 41 can output a voltage having a rectangular waveform.

The control unit 50 is configured as a computer including a CPU, a RAN, a ROM, and an I/O. The CPU executes various processing in accordance with a program stored in the ROM. The control unit 50 controls the output voltage of the power supply circuit 40, and controls the output voltage of the power supply circuit 41. Note that each of the RAM and the ROM is a non-transitory tangible storage medium.

Next, an operation of the ionic wind delivery device will be described with reference to FIGS. 2 and 3. The control unit 50 controls the output voltage of the power supply circuit 40 so that a voltage to induce corona discharge between the first discharge electrode 20 and the reference electrode 30 is applied, and controls the output voltage of the power supply circuit 41 so that a voltage to induce corona discharge between the second discharge electrode 21 and the control electrode 31 is applied. That is, the control unit 50 controls the output voltage of the power supply circuits 40, 41 to continuously induce the corona discharge between the first discharge electrode 20 and the reference electrode 30 as well as to continuously induce the corona discharge between the electrode 21 and the control electrode 31. The voltage to induce the corona discharge between the first discharge electrode 20 and the reference electrode 30 is −3 kV in the present embodiment. The voltage to induce the corona discharge between the second discharge electrode 21 and the control electrode 31 is 3 kV in the present embodiment. Therefore, the potential of the first discharge electrode 20 is −3 kV, the potential of the reference electrode 30 is 0 V, and the potential of the control electrode 31 is +3 kV.

When the voltage of −3 kV is applied between the first discharge electrode 20 and the reference electrode 30, as described above, a strong electric field occurs in the vicinity of the end portion 20a of the first discharge electrode 20. Thus, as shown in a region R1 of FIG. 2, the corona discharge is induced on a periphery of the first discharge electrode 20, and thus the corona discharge is generated between the first discharge electrode 20 and the reference electrode 30.

Figure 2:
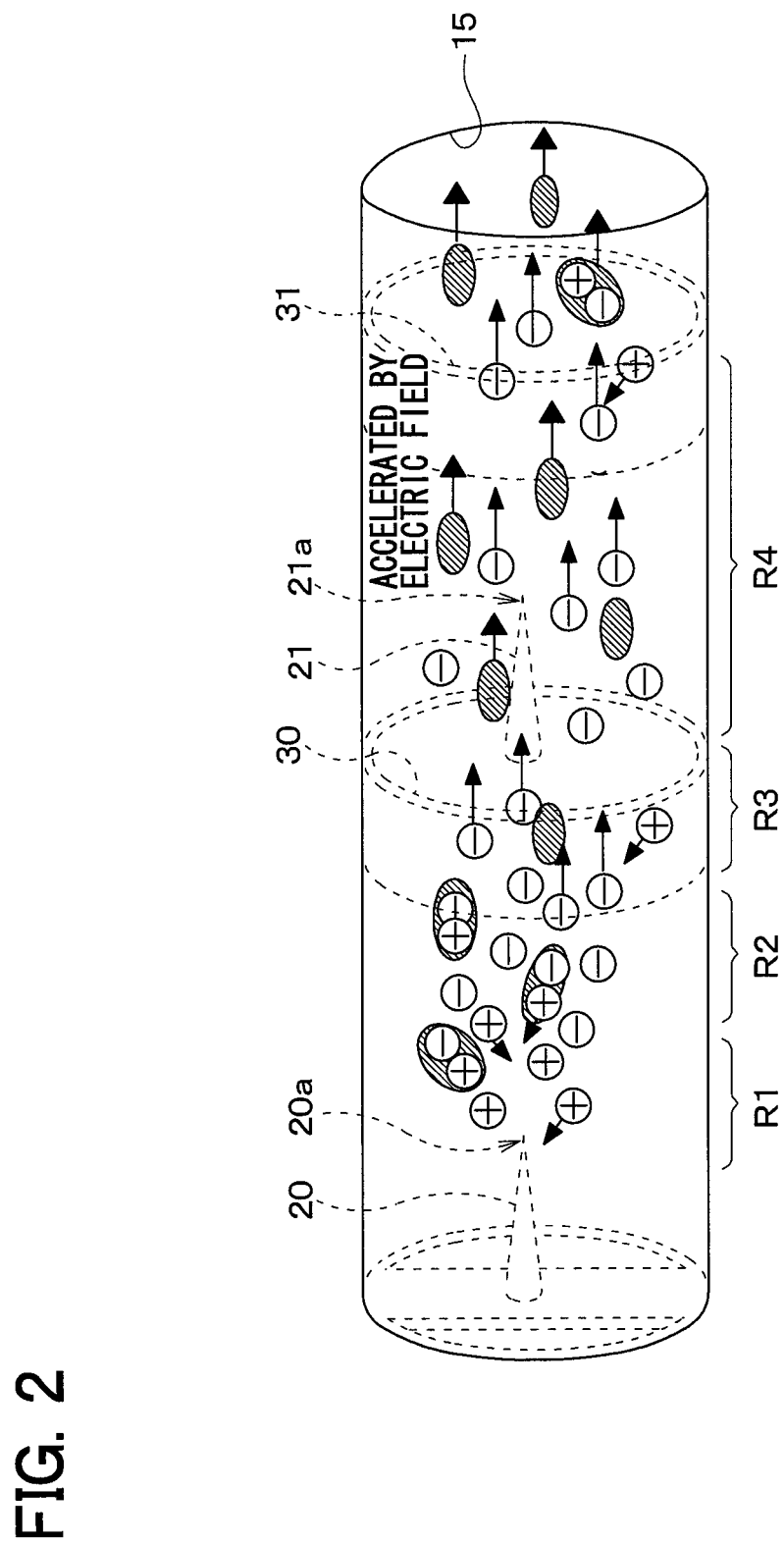
FIG. 2 is a diagram for explaining generation of an ionic wind.
Figure 3:
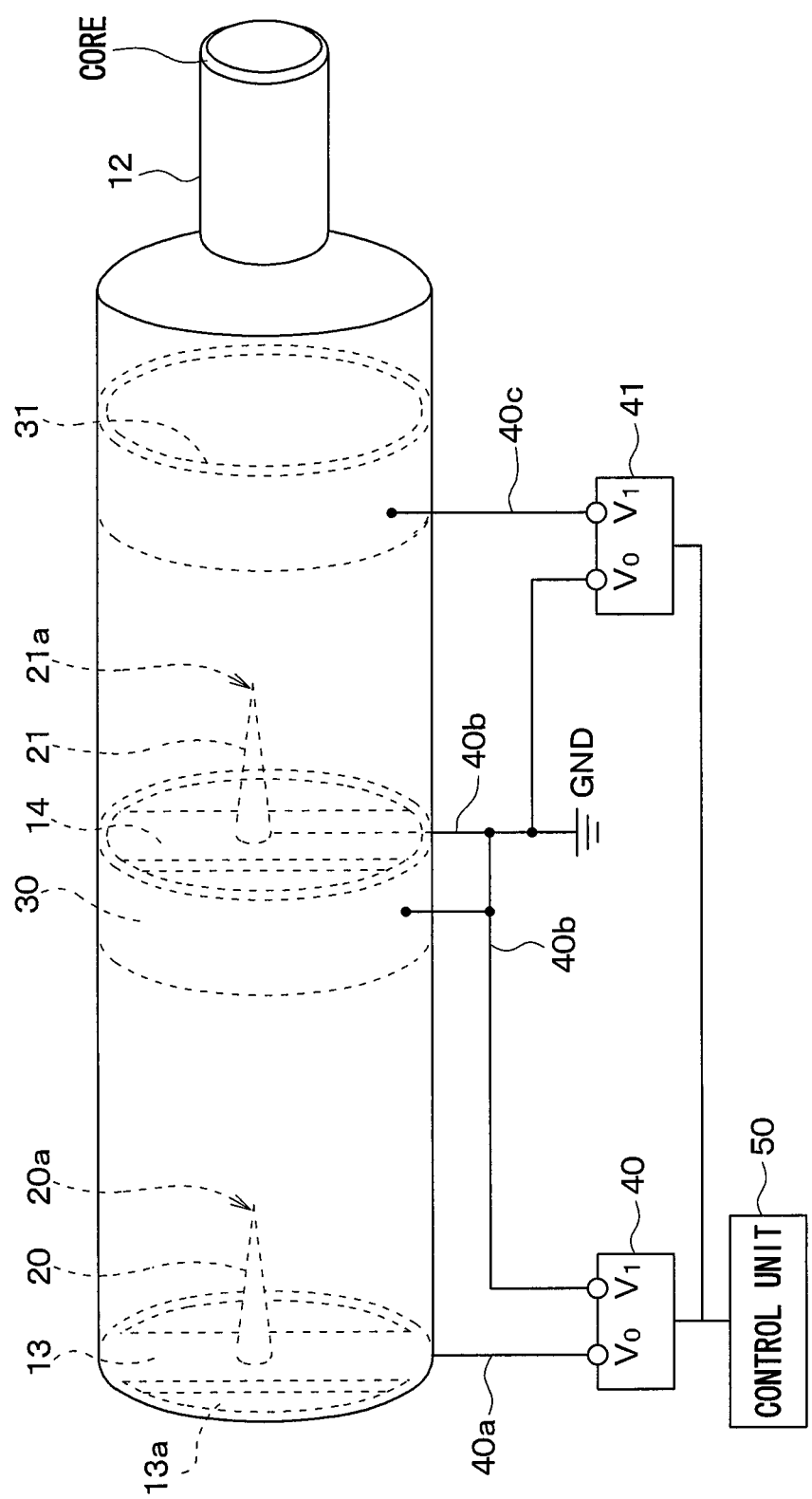
FIG. 3 is a diagram illustrating a structure of an ionic wind delivery device according to a second embodiment.

Further, as shown in a region R2 of FIG. 2, air on the periphery of the first discharge electrode 20 is ionized due to an occurrence of the corona discharge, and thus air ions are generated. Specifically, the air on the periphery of the first discharge electrode 20 is ionized to generate positive ions and negative ions.

Further, as shown in a region R3 of FIG. 2, the negative ions are accelerated by an electric field between the electrodes and moved toward the reference electrode 30. In this case, while the negative ions moves toward the reference electrode 30, air on the periphery of the first discharge electrode 20 and air around the reference electrode 30 are involved to the negative ions. As a result, an ionic wind is generated. The ionic wind passes through the inside of the reference electrode 30.

The potential of the reference electrode 30 is 0 V, and the potential of the control electrode 31 is 3 kV. Therefore, the negative ions having passed through the reference electrode 30 are accelerated while moving toward the control electrode 31, as shown in a region R4 of FIG. 2. As a result, a larger ionic wind is generated. The ionic wind having passed through the control electrode 31 is emitted out from the opening 15 formed at the other end of the case 10.

The potential of the second discharge electrode 21 is 0 V, and the potential of the control electrode 31 is 3 kV. Therefore, a strong electric field is generated in the vicinity of the end portion 21a of the second discharge electrode 21, and the corona discharge is induced on a periphery of the second discharge electrode 21. Thus, the corona discharge occurs between the second discharge electrode 21 and the control electrode 31.

As described above, the corona discharge is induced not only between the first discharge electrode 20 and the reference electrode 30, but also between the second discharge electrode 21 and the control electrode 31.

Further, the air on the periphery of the second discharge electrode 21 is ionized, due to the occurrence of the corona discharge, so as to generate the positive ions and the negative ions. The negative ions are accelerated due to the electric field between the electrodes and moved toward the control electrode 31. In this case, the negative ions that are generated due to the corona discharge occurred between the second discharge electrode 21 and the control electrode 31 also involve air on the periphery of the second discharge electrode 21 and air round the control electrode 31 while moving toward the control electrode 31. As a result, the ionic wind occurs. The ionic wind that has passed through the control electrode 31 is blown out from the opening 15 formed at the other end of the case 10.

In the structure described above, the control electrode 31 is arranged on the delivery path of the ionic wind of the ions that are generated by the corona discharge induced between the first discharge electrode 20 and the reference electrode 30. Further, the ions generated between the first discharge electrode 20 and the reference electrode 30 are accelerated by the voltage output by the power supply circuit 41. In addition, ions are added due to the corona discharge induced between the second discharge electrode 21 and the control electrode 31. Accordingly, the ionic wind can be further accelerated.

Second Embodiment

Next, an ionic wind delivery device according to a second embodiment will be described with reference to FIGS. 3, 4 and 5. The ionic wind delivery device of the present embodiment has a different structure from the ion delivery device of the first embodiment as the case 10 has a jet nozzle 12. The jet nozzle 12 corresponds to a jet opening.

The case 10 has the jet nozzle 12 that has a tubular shape and emits a jet stream of the ionic wind of the ions generated by the corona discharge induced inside of the case 10. Specifically, the case 10 has an opening 13a for drawing air outside of the case 10 into the case 10, at an end of the body portion 11 with respect to the longitudinal direction of the body portion 11. The jet nozzle 12 having the tubular shape is provided at the other end of the body portion 11 with respect to the longitudinal direction to emit the jet stream of the ionic wind of the ions generated due to the corona discharge. The nozzle 12 has a diameter smaller than the diameter of the body portion 11. That is, the hydraulic diameter of an air passage in the jet nozzle 12 is smaller than the hydraulic diameter of an air passage in the body part 11.

In the first embodiment described above, the corona discharge is continuously induced between the first discharge electrode 20 and the reference electrode 30, as well as the corona discharge is continuously induced between the second discharge electrode 21 and the control electrode 31. In the present embodiment, on the other hand, the corona discharge is intermittently induced synchronously between the first discharge electrode 20 and the reference electrode 30 and between the second discharge electrode 21 and the control electrode 31.

Next, an operation of the ionic wind delivery device of the present embodiment will be described. Firstly, as shown in FIG. 4, the control unit 50 controls the power supply circuit 40 to output the voltage of −2 kV from the power supply circuit 40. As a result, the first discharge electrode 20 has the potential of −2 kV, and the reference electrode 30 has the potential of 0 V. In this case, even when the output voltage of the power supply circuit 40 is −2 kV, corona discharge does not occur on the periphery of the first discharge electrode 20.

At the same time, the control unit 50 controls the power supply circuit 41 so that the output voltage of the power supply circuit 41 is 0 V. As a result, each of the second discharge electrode 21, the control electrode 31 and the reference electrode 30 has the potential of 0 V. Therefore, corona discharge does not occur on the periphery of the second discharge electrode.

Figure 4:
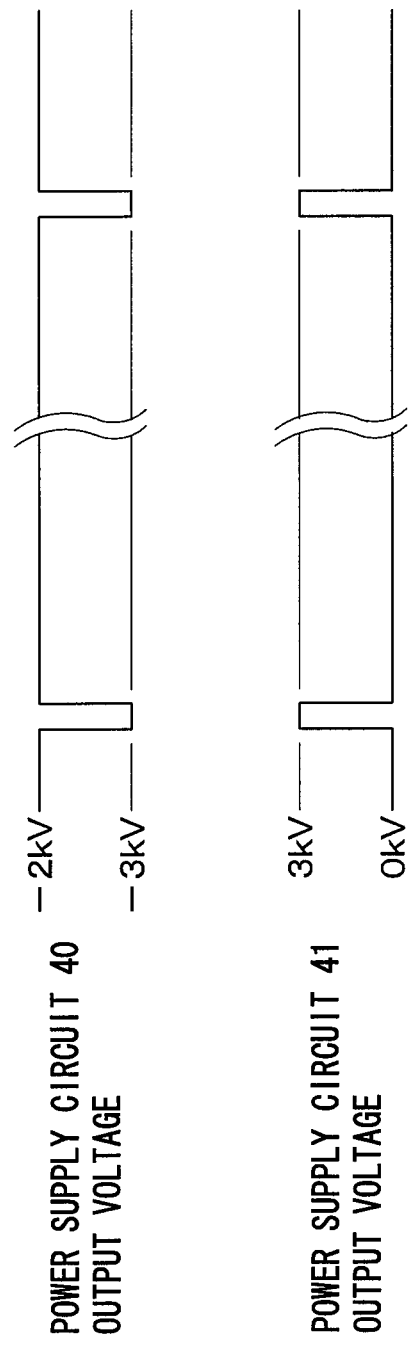
FIG. 4 is a diagram illustrating waveforms of outputs of power supply circuits of a jet stream generation device according to the second embodiment.

Next, as shown in FIG. 4, the control unit 50 controls the power supply circuit 40 and the power supply circuit 41 so that the power supply circuit 40 outputs the voltage of −3 kV for a fixed period of time, and the power supply circuit 41 outputs the voltage of 3 kV for the same fixed period of time. In the present embodiment, the fixed period of time is 0.2 seconds. The control unit 50 controls the power supply circuit 40 and the power supply circuit 41 so that the output voltage of the power supply circuit 40 and the output voltage of the power supply circuit 41 are switched simultaneously. As a result, the potential of the first discharge electrode 20 is −3 kV, and the potentials of the second discharge electrode 21 and the reference electrode 30 are 0 V, and the potential of the control electrode 31 is 3 kV.

As described above, when the voltage of −3 kV is applied between the first discharge electrode 20 and the reference electrode 30, a strong electric field is generated in the vicinity of the end portion 20a of the first discharge electrode 20. As a result, as shown in a region R11 of FIG. 5, coronal discharge is induced on a periphery of the first discharge electrode 20, and thus the corona discharge is induced between the first discharge electrode 20 and the reference electrode 30.

Figure 5:
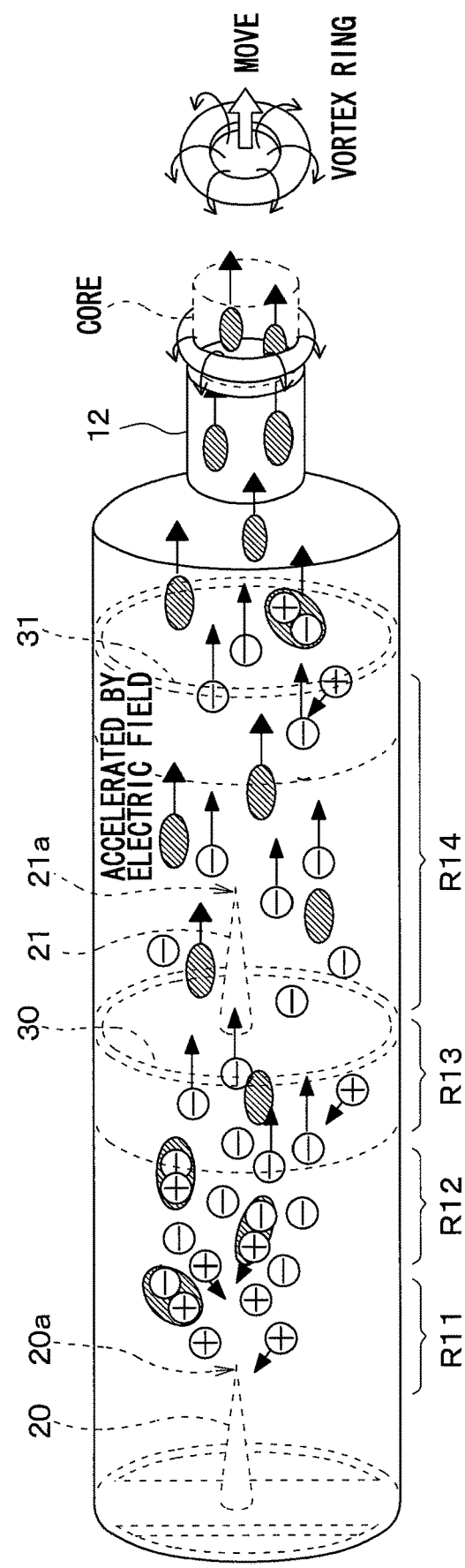
FIG. 5 is a diagram for explaining generation of a jet stream.

As shown in a region R12 of FIG. 5, air on the periphery of the first discharge electrode 20 is ionized due to the occurrence of the corona discharge, and thus air ions are generated. Specifically, the air on the periphery of the first discharge electrode 20 is ionized, and thus positive ions and negative ions are generated.

Further, as shown in a region R13 of FIG. 5, the negative ions are accelerated by the electric field between the electrodes, and moved toward the reference electrode 30. As shown in a region R14 of FIG. 5, air on the periphery of the first discharge electrode 20 and air around the reference electrode 30 are involved in the negative ions while the negative ions are moved toward the reference electrode 30. As a result, an ionic wind is generated.

In addition, since the potential of the control electrode 31 is 3 kV, and the potential of the reference electrode 30 is 0 V, the negative ions having passed through the reference electrode 30 are accelerated while moving toward the control electrode 31. As a result, a larger ionic wind is generated. The ionic wind having passed through the control electrode 31 is blown out as a jet stream from the jet nozzle 12.

In this case, a core of a cylindrical air jet stream is blown out from the jet nozzle 12. The core of the air jet stream blown out from the jet nozzle 12 forms a vortex ring due to friction with surrounding air that is stationary. In this way, the vortex ring of air is generated.

A part of the negative ions inside of the case 10 is absorbed through the ground terminal GND. An another part of the negative ions inside of the case 10 stays inside of the case 10 in a state of ions. A further another part of the negative ion inside of the case 10 is emitted out, together with a peripheral air, from the jet nozzle 12 to the outside of the case 10.

The potential of the second discharge electrode 21 is 0 V, and the potential of the control electrode 31 is 3 kV. Therefore, a strong electric field is generated in the vicinity of the end portion 21a of the second discharge electrode 21, and corona discharge is induced also on the periphery of the second discharge electrode 21. Thus, the corona discharge is generated also between the second discharge electrode 21 and the control electrode 31, and thus the negative ions are added. The negative ions added are also accelerated while moving toward the control electrode 31. As a result, a larger ionic wind is generated. The ionic wind accelerated as described above is emitted out as a jet stream from the jet nozzle 12 to the outside of the case 10.

In the present embodiment, the advantageous effects similar to the first embodiment can be achieved by the structures that are common to the first embodiment.

The ionic air delivery device includes a case 10 and a control unit 50. The case 10 accommodates the control electrode 31, and has the jet nozzle 12. The jet nozzle 12 emits out, as a jet stream, the ionic wind of the ions generated by the corona discharge induced between the second discharge electrode 21 and the control electrode 31, together with the ionic wind of the ions generated by the corona discharge induced between the first discharge electrode 20 and the reference electrode 30. The control unit 50 controls the power supply circuit 41 so that the output voltage of the power supply circuit 41 is switched between a voltage that does not induce the corona discharge between the second discharge electrode 21 and the control electrode 31, and a voltage that induce the corona discharge between the second discharge electrode 21 and the control electrode 31.

In such a configuration, the ionic wind of the negative ions generated by the corona discharge induced between the second discharge electrode 21 and the control electrode 31 can be emitted out from the jet nozzle 12 of the case 10 as a jet stream.

The control unit 50 controls the power supply circuit 40 and the power supply circuit 41 so that, in the entirety of the period of time where the output voltage of the power supply circuit 41 is switched to and kept to the voltage that does not induce the corona discharge between the second discharge electrode 21 and the control electrode 31, the output voltage of the power supply circuit 40 is switched to and kept to the voltage that does not induce the corona discharge between the first discharge electrode 20 and the reference electrode 30. Further, the control unit 50 controls the power supply circuit 40 and the power supply circuit 41 so that, in the entirety of the period of time where the output voltage of the power supply circuit 41 is switched to and kept to the voltage that induce the corona discharge between the second discharge electrode 21 and the control electrode 31, the output voltage of the power supply circuit 40 is switched to and kept to the voltage that induces the corona discharge between the first discharge electrode 20 and the reference electrode 30.

As described above, the control unit 50 induces the corona discharges between the second discharge electrode 21 and the control electrode 31 and between the first discharge electrode 20 and the reference electrode 30, in the entirety of the period of time where the output voltage of the power supply circuit 41 is switched to and kept to the voltage that induces the corona discharge between the second discharge electrode 21 and the control electrode 31. Therefore, a stronger jet stream can be emitted out from the jet nozzle 12 of the case 10.

Third Embodiment

Next, an ionic wind delivery device according to a third embodiment will be described. The ionic wind delivery device of the third embodiment has the same structure as that of the ionic wind delivery device of the second embodiment described hereinabove.

Figure 6:
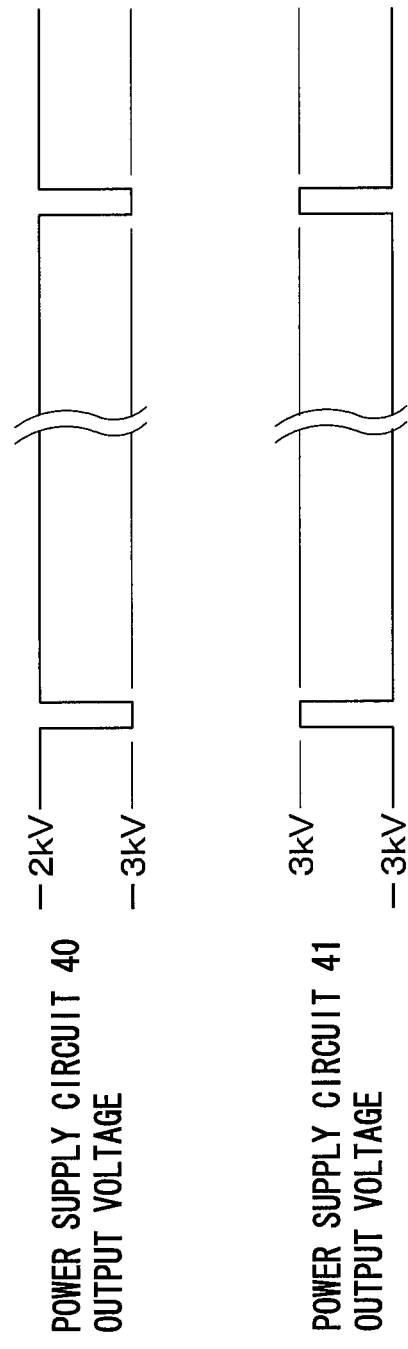
FIG. 6 is a diagram illustrating waveforms of outputs of power supply circuits of a jet stream generation device according to a third embodiment.

In the second embodiment described hereinabove, the output voltage of the power supply circuit 41 is switched between 0 V and 3 kV. In the present embodiment, as shown in FIG. 6, the output voltage of the power supply circuit 41 is switched between −3 kV and 3 kV. The control unit 50 controls the output voltage of the power supply circuit 41 so that ions present between the reference electrode 30 and the control electrode 31 are moved toward the reference electrode 30, before controlling the output voltage of the power supply circuit 41 to a discharge voltage. The discharge voltage is a voltage to accelerate ions generated by corona discharge induced between the first discharge electrode 20 and the reference electrode 30, as well as to induce corona discharge between the second discharge electrode 21 and the control electrode 31. In the present embodiment, the discharge voltage is 3 kV. Specifically, the control unit 50 controls the power supply circuit 41 so that the output voltage of the power supply circuit 41 is controlled to −3 kV, before the output voltage of the power supply circuit 41 is controlled to the discharge voltage.

Figure 7:
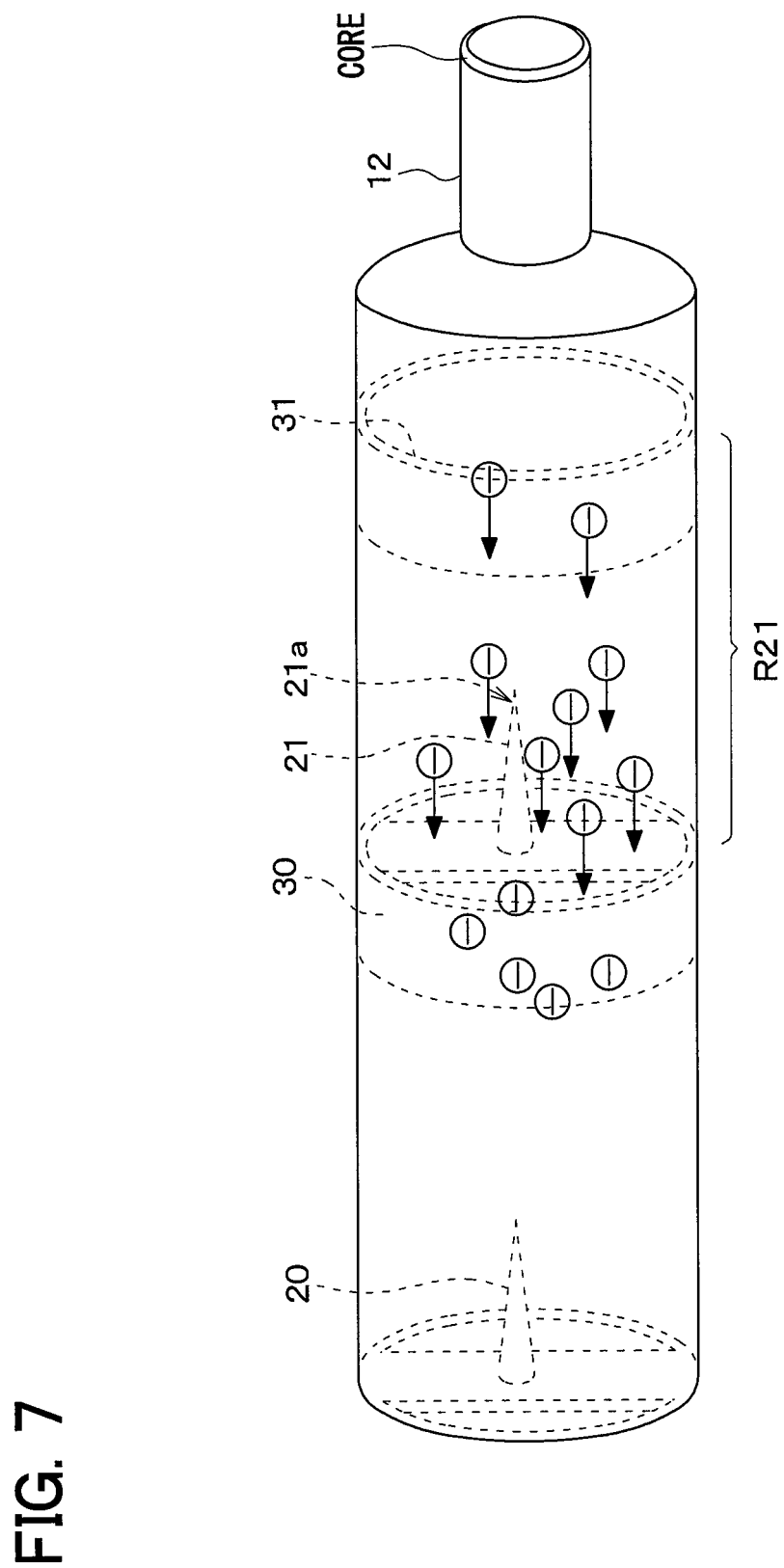
FIG. 7 is a diagram for explaining accumulation of ions.

As a result, as shown in a region R21 of FIG. 7, negative ions present between the reference electrode 30 and the control electrode 31 is urged to move toward the reference electrode 30, and is accumulated. Therefore, when the output voltage of the power supply circuit 41 is controlled next time so as to accelerate negative ions generated by the corona discharge toward a jet nozzle 12, the negative ions are also accelerated while moving toward the control electrode 31. Therefore, a larger ionic wind is generated, and blown out from the jet nozzle 12 as a jet stream. Namely, the velocity of the jet stream emitted out from the jet nozzle 12 can be increased, as compared with the jet stream generation device of the second embodiment described hereinabove. Further, the quantity of the negative ions emitted out as the jet stream from the jet nozzle 12 to the outside of the case 10 can be increased.

In the present embodiment, the advantageous effects similar to the second embodiment can be achieved by the structures that are common to the second embodiment.

The control unit 50 controls the power supply circuit 40 and the power supply circuit 41 so that the output voltage of the power supply circuit 40 is switched to the voltage that induces the corona discharge between the first discharge electrode 20 and the reference electrode 30, as well as the output voltage of the power supply circuit 41 is switched to the voltage that induces the corona discharge between the second discharge electrode 21 and the control electrode 31. Further, the control unit 50 performs a predetermined control after the ionic wind of the ions generated by the corona discharges induced between the first discharge electrode 20 and the reference electrode 30 and between the second discharge electrode 21 and the control electrode 31 is emitted out as a jet stream from the jet nozzle 12. In the predetermined control, the control unit 50 performs a returning control, before performing the discharge control again. In the discharge control, the power supply circuit 41 is controlled to output the voltage that induces the corona discharge between the second discharge electrode 21 and the control electrode 31. In the returning control, the power supply circuit 41 is controlled to output the voltage that urges ions present between the reference electrode 30 and the control electrode 31 to move toward the reference electrode 30.

In such a configuration, the output voltage of the power supply circuit 41 is controlled so as to move the ions present between the reference electrode 30 and the control electrode 31 toward the reference electrode 30. Therefore, the negative ions present between the reference electrode 30 and the control electrode 31 are moved toward the reference electrode 30 as being urged to return toward the reference electrode 30, and are accumulated. Therefore, when the output voltage of the power supply circuit 41 is controlled so as to accelerate the negative ions toward the jet nozzle 12 again, the negative ions returned toward the reference electrode 30 are also accelerated while moving toward the control electrode 31. As a result, the larger ionic wind is generated, and is blown out from the jet nozzle 12 as the jet stream. Namely, the velocity of the jet stream emitted out from the jet nozzle 12 can be further increased, as compared with the second embodiment.

Also in the present embodiment, similarly to the second embodiment, the core of the air jet stream having a tubular shape is blown out from the jet nozzle 12. The core of the air jet stream blown out from the jet nozzle 12 forms the vortex ring due to the friction with the peripheral stationary air. In this way, the vortex air ring is generated.

Fourth Embodiment

Figure 8:
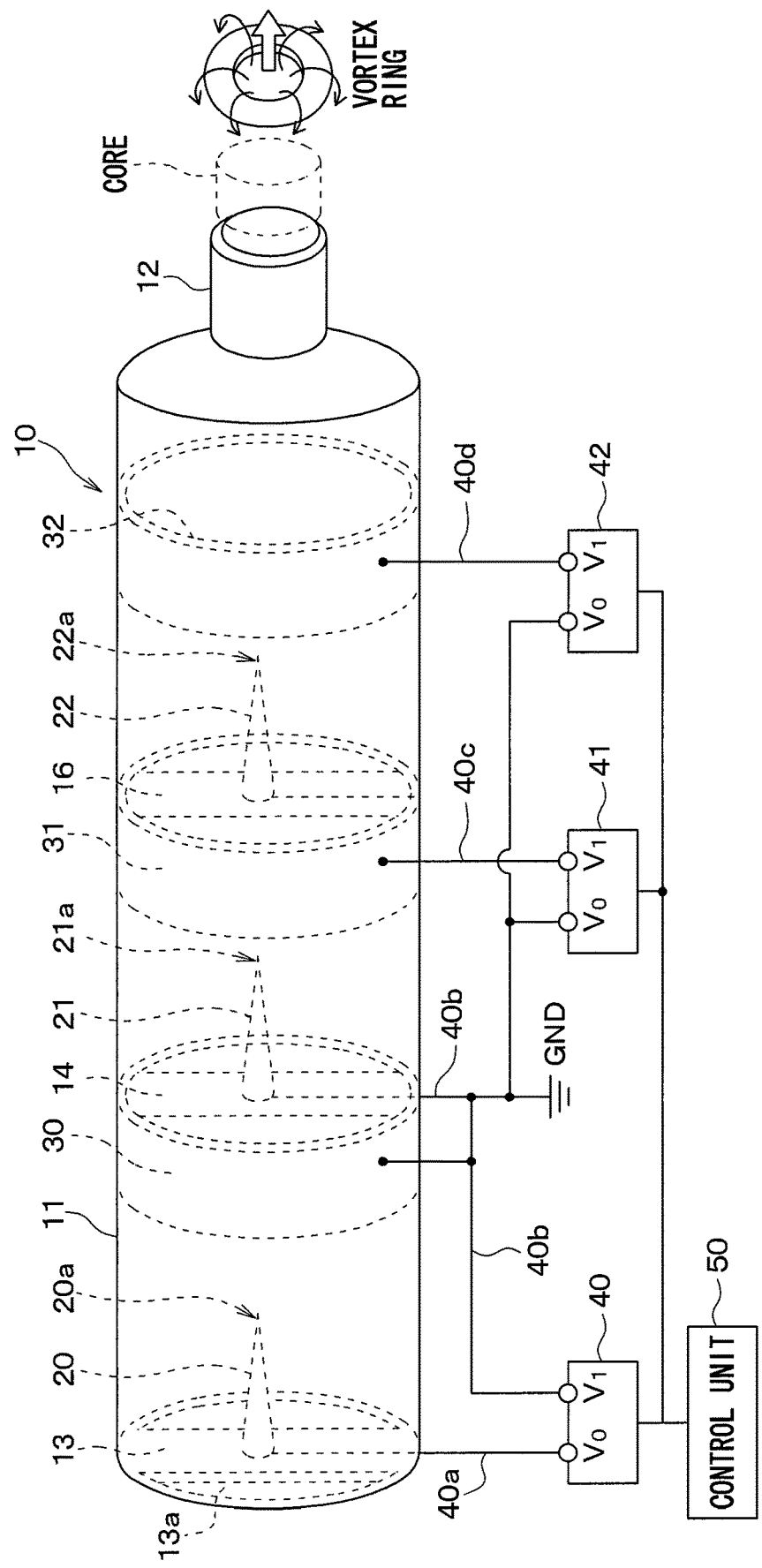
FIG. 8 is a diagram illustrating a structure of an ionic wind delivery device according to a fourth embodiment.

An ionic wind delivery device according to a fourth embodiment will be described. FIG. 8 shows a structure of the ionic wind delivery device according to the present embodiment. The structure of the ionic wind delivery device of the present embodiment is different from the ionic wind delivery device of the second embodiment described above as further having a third discharge electrode 22, a control electrode 32 and a power supply circuit 42. The ionic wind delivery device of each of the first to third embodiments has a two-step electrode-pair structure in which an electrode pair made of the first discharge electrode 20 and the reference electrode 30 and an electrode pair made of the second discharge electrode 21 and the control electrode 31 are connected in series. On the other hand, the ionic wind delivery device of the present embodiment has a three-step electrode-pair structure that further includes an electrode pair made of a third electrode 22 and a control electrode 32, the electrode pair being connected to the other two electrode pairs in series.

The third discharge electrode 22 has an end portion 22a having a needle shape, and is provided by a member made of a conductive metal (e.g., copper). The control electrode 31 has a hollow cylindrical shape. Inside of the control electrode 31, a support portion 16 supporting the third discharge electrode 22 is formed. The third discharge electrode 22 is supported by the support portion 16 formed inside of the control electrode 31. The third discharge electrode 22 is connected to the control electrode 31. Thus, the third discharge electrode 22 and the control electrode 31 have the same potential.

The control electrode 32 has a hollow cylindrical shape. The control electrode 32 is provided by a member made of a conductive metal (e.g., copper). The control electrode 32 is disposed inside of the case 10 such that an outer surface of the control electrode 32 is in contact with an inner surface of the case 10. The control electrode 32 is a second control electrode that is arranged on a delivery path of an ionic wind of ions generated by corona discharge induced between the second discharge electrode 21 and the control electrode 31.

The power supply circuit 42 generates an output voltage to control a potential difference between the third discharge electrode 22 and control electrode 31 and the control electrode 32. The power supply circuit 42 is a third power supply circuit that outputs a discharge voltage. The discharge voltage is a voltage to accelerate ions generated by corona discharge induced between the third discharge electrode 22 and the control electrode 32 and to induce corona discharge between the third discharge electrode 22 and the control electrode 32.

The power supply circuit 42 has a first output terminal $V_0$ and a second output terminal $V_1$. The first output terminal $V_0$ of the power supply circuit 42 is connected through wiring 40b to the second discharge electrode 21, the reference electrode 30, the first output terminal $V_0$ of the power supply circuit 41, the second output terminal $V_1$ of the power supply circuit 40 and the ground terminal GND. The second output terminal $V_1$ of the power supply circuit 42 is connected to the control electrode 32 through a wiring 40d. The second output terminal $V_1$ and the case 10 are insulated from each other, and the first output terminal $V_0$ and the case 10 are insulated from each other.

The power supply circuit 42 can output not only the output voltage of equal to or greater than −6 kV and equal to or less than 6 kV, but also the output voltage of −6 kV or less and the output voltage of than 6 kV or more. Also, the power supply circuit 41 can output the voltage having a rectangular waveform.

As described above, the ionic wind delivery device of the present embodiment has the three-step electrode-pair structure in which the electrode pair made of the first discharge electrode 20 and the reference electrode 30, the electrode pair made of the second discharge electrode 21 and the control electrode 31, and the electrode pair made of the third discharge electrode 22 and the control electrode 32 are connected in series.

As shown in FIG. 6, the ionic wind delivery device of the present embodiment controls the power supply circuits 40, 41, 42 so that the output voltage of the power supply circuit 40 is switched between −3 kV and −2 kV, the output voltage of the power supply circuit 41 is switched between 0 V and 3 kV, and the output voltage of the power supply circuit 42 is switched between 0 V and 6 kV.

In the present embodiment, the advantageous effects similar to the first embodiment can be achieved by the structures that are common to the first embodiment.

The ionic wind delivery device of the present embodiment includes the control electrode 32 that is arranged on the delivery path of the ionic wind of ions generated by corona discharge induced between the second discharge electrode 21 and the control electrode 31, and the third discharge electrode 22 that is arranged between the control electrode 31 and the control electrode 32. The ionic wind delivery device of the present embodiment further includes the power supply circuit 42 that outputs the voltage to accelerate the ions generated by corona discharge induced between the third discharge electrode 22 and the control electrode 32, and to induce the corona discharge between the third discharge electrode 22 and the control electrode 32.

In such a configuration, further, the ions generated by the corona discharge induced between the third discharge electrode 22 and the control electrode 32 can be accelerated, as well as the corona discharge can be induced between the third discharge electrode 22 and the control electrode 32.

The ionic wind delivery device of the present embodiment has a case 10 that accommodates the control electrode 32 and has a jet nozzle 12. The jet nozzle 12 emits out the ionic wind of ions generated by the corona discharge induced between the first discharge electrode 20 and the reference electrode 30 as a jet stream. Also, the jet nozzle 12 also emits out the ionic wind of ions generated by the corona discharge induced between the second discharge electrode 21 and the control electrode 31. Further, the jet nozzle 12 emits out the ionic wind of ions generated by the corona discharge induced between the third discharge electrode 22 and the control electrode 32.

The ionic wind delivery device of the present embodiment has a control unit 50. The control unit 50 controls the power supply circuit 40 to switch the output voltage of the power supply circuit 40 between a voltage that does not induce corona discharge between the first discharge electrode 20 and the reference electrode 30, and a voltage that induces corona discharge between the first discharge electrode 20 and the reference electrode 30. The control unit 50 controls the power supply circuit 41 to switch the output voltage of the power supply circuit 41 between a voltage that does not induce corona discharge between the second discharge electrode 21 and the control electrode 31, and a voltage that induces corona discharge between the second discharge electrode 21 and the control electrode 31. In addition, the control unit 50 controls the power supply circuit 42 to switch the output voltage of the power supply circuit 42 between a voltage that does not induce coronal discharge between the third discharge electrode 22 and the control electrode 32, and a voltage that induces coronal discharge between the third discharge electrode 22 and the control electrode 32.

Therefore, the ionic wind of negative ions generated by the corona discharge induced between the third discharge electrode 22 and the control electrode 32 can be emitted out as a jet stream from the jet nozzle 12, together with the ionic wind of negative ions generated by the corona discharge induced between the second discharge electrode 21 and the control electrode 31.

The control unit 50 controls the power supply circuit 42 to switch the output voltage to the voltage that does not induce the corona discharge between the third discharge electrode 22 and the control electrode 32 in the entirety of a period of time in which the output voltage of the power supply circuit 41 is switched and kept to the voltage that does not induce the corona discharge between the second discharge electrode 21 and the control electrode 31.

The control unit 50 controls the power supply circuit 42 to switch the output voltage to the voltage that induces the corona discharge between the third discharge electrode 22 and the control electrode 32 in the entirety of a period of time in which the output voltage of the power supply circuit 41 is switched to and kept at the voltage that induces the corona discharge between the second discharge electrode 21 and the control electrode 31.

As described above, the control unit 50 performs control to induce the corona discharge between the second discharge electrode 21 and the control electrode 31 and to induce the corona discharge between the third discharge electrode 22 and the control electrode 32, in the entirety of the period of time in which the output voltage of the power supply circuit 42 is switched to and kept at the voltage that induces the corona discharge between the third discharge electrode 22 and the control electrode 32. Therefore, a stronger jet stream can be emitted out from the jet nozzle 12 of the case 10.

The control unit 50 controls the power supply circuit 40 to switch the output voltage to the voltage that does not induce the corona discharge between the first discharge electrode 20 and the reference electrode 30 in the entirety of a period of time in which the output voltage of the power supply circuit 41 is switched to and kept at the voltage that does not induce the corona discharge between the second discharge electrode 21 and the control electrode 31. The control unit 50 controls the power supply circuit 40 to switch the output voltage to the voltage that induces the corona discharge between the first discharge electrode 20 and the reference electrode 30 in the entirety of a period of time in which the output voltage of the power supply circuit 41 is switched to and kept at the voltage that induces the corona discharge between the second discharge electrode 21 and the control electrode 31.

In such a configuration, since the corona discharge is further induced between the second discharge electrode 21 and the control electrode 31 in the entirety of the period of time in which the output voltage of the power supply circuit 41 is switched to and kept at the voltage that induces the corona discharge between the second discharge electrode 21 and the control electrode 31, the stronger jet stream can be emitted out from the jet nozzle 12 of the case 10.

Fifth Embodiment

Figure 9:
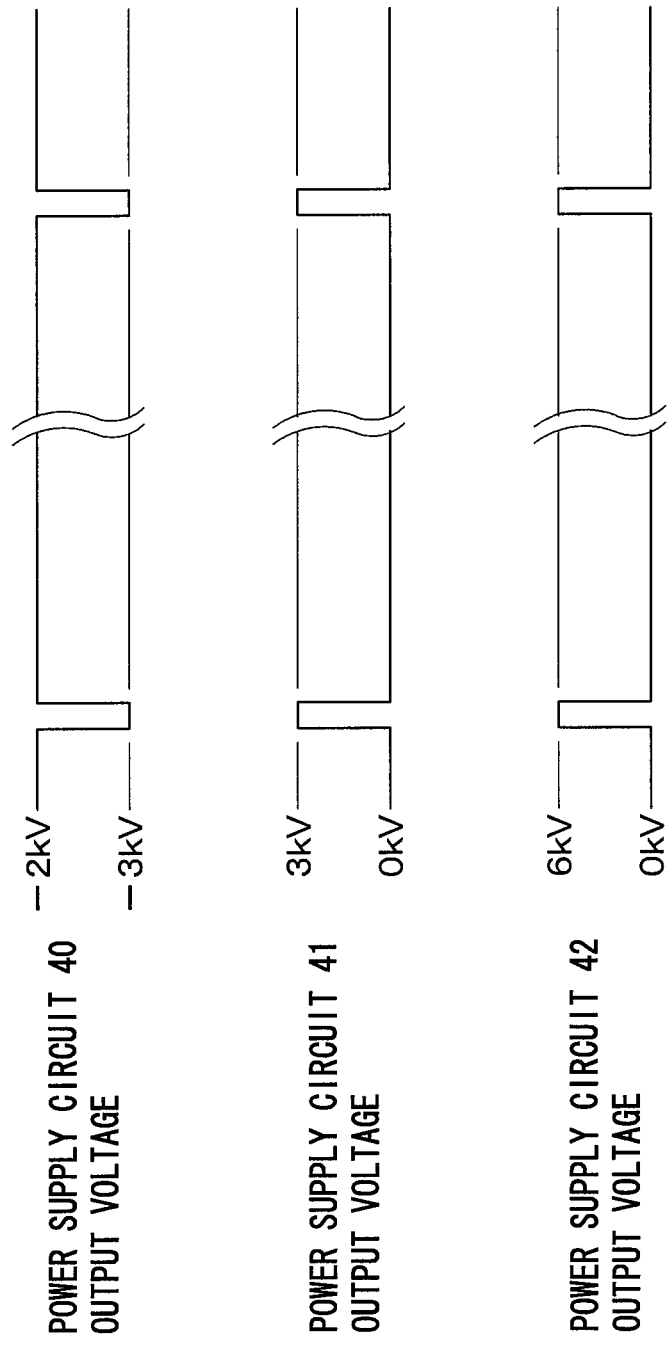
FIG. 9 is a diagram illustrating waveforms of outputs of power supply circuits of a jet stream generation device according to the fourth embodiment.
Figure 10:
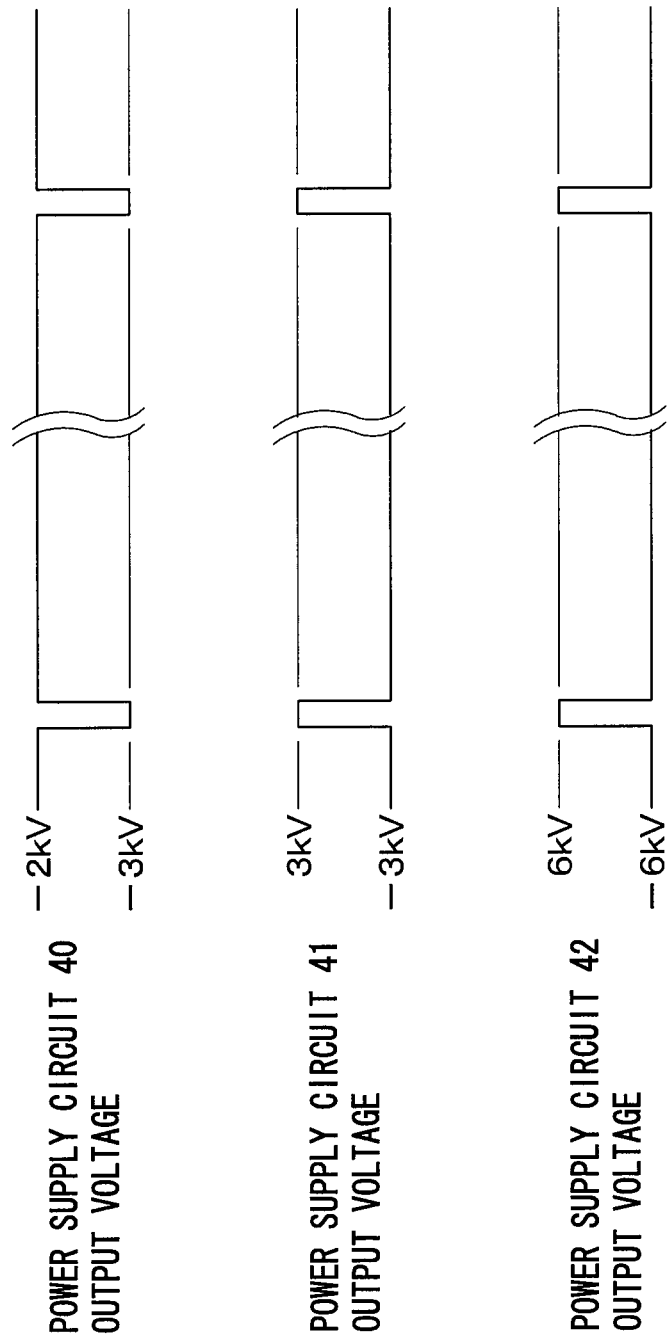
FIG. 10 is a diagram illustrating waveforms of outputs of power supply circuits of a jet stream generation device according to the fifth embodiment.

An ionic wind delivery device according to a fifth embodiment will be described. The ionic wind delivery device of the present embodiment has the same structure as the ionic wind delivery device of the fourth embodiment described above. In the ionic wind delivery device of the fourth embodiment, as shown in FIG. 9, an output voltage of the power supply circuit 41 is switched between 0 V and 3 kV, and an output voltage of the power supply circuit 42 is switched between 0 V and 6 kV. The ionic wind delivery device of the present embodiment is different from the ionic wind delivery device of the fourth embodiment on a point that the output voltage of the power supply circuit 41 is switched between −3 kV and +3 kV, and the output voltage of the power supply circuit 42 is switched between −6 kV and +6 kV, as shown in FIG. 10.

A control unit 50 of the present embodiment controls the power supply circuit 40 to switch the output voltage of the power supply circuit 40 to a voltage that induces corona discharge between the first discharge electrode 20 and the reference electrode 30. At the same time, the control unit 50 controls the power supply circuit 41 to switch the output voltage of the power supply circuit 41 to a voltage that induces corona discharge between the second discharge electrode 21 and the control electrode 31. Also at the same time, the control unit 50 controls the power supply circuit 42 to switch the output voltage of the power supply circuit 42 to a voltage that induces corona discharge between the third discharge electrode 22 and the control electrode 32.

Therefore, the following operation will be implemented. Firstly, corona discharge occurs between the first discharge electrode 20 and the reference electrode 30, between the second discharge electrode 21 and the control electrode 31, and between the third discharge electrode 22 and the control electrode 32. Further, the ionic wind of ions generated by the corona discharge is emitted out as a jet stream from the jet nozzle 12. Thereafter, the control unit 50 performs two predetermined controls before controlling the power supply circuit 42 again to output the voltage that induces the corona discharge between the third discharge electrode 22 and the control electrode 32. The two predetermined controls are performed simultaneously. One of the two predetermined controls is control of the power supply circuit 42 to output the voltage to move ions present between the control electrode 31 and the control electrode 32 toward the control electrode 31. The other of the two predetermined controls is control of the power supply circuit 41 to output the voltage to move ions present between the reference electrode 30 and the control electrode 31 toward the reference electrode 30.

In such a configuration, negative ions are moved and accumulated as the ions present between the control electrode 31 and the control electrode 32 are urged and returned toward the control electrode 31. Also, the negative ions are moved and accumulated as the ions present between the reference electrode 30 and the control electrode 31 are urged and returned toward the reference electrode 30.

As such, when the output voltage of the power supply circuit 41 is controlled again so as to accelerate the negative ions generated by the corona discharge toward the jet nozzle 12, these negative ions are also accelerated while moving toward the control electrodes 31, 32. As a result, a larger ionic wind is generated, and this ionic wind is emitted out from the jet nozzle 12 as a jet stream. That is, the velocity of the jet stream emitted out from the jet nozzle 12 can be increased, as compared with the jet stream generation device of the fourth embodiment described above.

Other Embodiments (1) In each of the embodiments described hereinabove, the corona discharge is induced between the first discharge electrode 20 and the reference electrode 30 as the output voltage of the power supply circuit 40 is controlled such that the potential of the first discharge electrode 20 is lower than the potential of the reference electrode 30. As another example, the corona discharge may be induced between the first discharge electrode 20 and the reference electrode 30 by controlling the output voltage of the power supply circuit 40 such that the potential of the reference electrode 30 is lower than the potential of the first discharge electrode 20.

(2) In each of the embodiments described hereinabove, the discharge electrodes 20, 21, 22 each have the end portion 20a with the needle shape. As another example, as shown in FIG. 11, the discharge electrode may be provided by a narrow wire. In this case, for example, the narrow wire may be arranged to be orthogonal to a direction along an axis of the case 10.

(3) In each of the embodiments described hereinabove, the second discharge electrode 21 and the reference electrode 30 have the same potential, and the third discharge electrode 22 and the control electrode 31 have the same potential. As another example, the second discharge electrode 21 and the reference electrode 30 may have substantially a same potential. Likewise, the third discharge electrode 22 and the control electrode 31 may have substantially a same potential.

(4) In the second to fifth embodiments described hereinabove, the tubular jet nozzle 12 is exemplified as a jet opening. As another example, the jet opening may be provided by an open hole.

(5) In the second and third embodiments described hereinabove, the discharge electrodes 20, 21, the reference electrode 30, and the control electrode 31 are accommodated in the case 10. As another example, the discharge electrodes 20, 21 and the reference electrode 30 may be arranged outside of the case 10 as long as the control electrode 31, which is on the last stage, is accommodated in the case 10.

(6) In the fourth and fifth embodiments described hereinabove, the discharge electrodes 20, 21, 22, the reference electrode 30 and the control electrodes 31, 32 are accommodated in the case 10. As another example, the discharge electrodes 20, 21, 22, the reference electrode 30, and the control electrodes 31 may be arranged outside of the case 10 as long as the control electrode 32, which is on the last stage, is accommodated in the case 10.

(7) In each of the embodiments described hereinabove, an aroma unit that has a plate emitting a fragrant component by such as aroma oil may be provided in the opening 13a of the case 10 or inside of the case 10. In such a case, since the aroma unit has a plate emitting the fragrant component, it is possible to emit the fragrant component from the jet nozzle 12.

(8) In each of the embodiments described hereinabove, the jet stream generation device is exemplarily installed to a meter or the like of a vehicle so as to produce a jet stream toward a face of a passenger of the vehicle to thereby improve comfort. As another example, the ionic wind delivery device may be configured to produce a jet stream of cold air or warm air toward a face or the like of a passenger of a vehicle, for the purpose of air-conditioning. In this case, for example, the ionic wind delivery device may be configured to draw cold air or warm air generated by an air conditioning apparatus from an opening 13a of the case 10.

(9) In each of the embodiments described hereinabove, the jet stream generation device is exemplarily installed to a meter or the like of a vehicle so as to emit a jet stream toward a face of a passenger of a vehicle. As another example, the jet stream generation device may be configured to emit a jet stream of air having high humidity toward passenger's face or the like of a vehicle. In this case, for example, the jet stream generation device may be configured to draw air with high humidity generated by a humidifier from the opening 13a of the case 10.

(10) In each of the embodiments described hereinabove, the jet stream generation device is exemplarily installed to a meter or the like of a vehicle so as to produce a jet stream toward a passenger's face of a vehicle. As another example, the jet stream generation device may be provided for each of passengers on the vehicle seats so as to individually produce a jet stream toward each passenger.

(11) In each of the embodiments described hereinabove, the jet stream generation device is exemplarily installed to a meter or the like of a vehicle so as to emit a jet stream toward a passenger's face of a vehicle. As another example, the jet stream generation device may be installed to a ceiling of a vehicle compartment, a steering wheel, a headrest or the like. The jet stream generation device may have a fixing portion to enable the jet stream generation device to be easily fixed to a meter of a vehicle, a ceiling of a vehicle compartment, a steering wheel, a headrest, or the like.

(12) In the fourth and fifth embodiments described hereinabove, the timing to switch the output voltage of the power supply circuit 40 and the timing to switch the output voltage of the power supply circuit 41 are synchronized. Further, the timing to switch the output voltage of the power supply circuit 40 and the timing to switch the output voltage of the power supply circuit 42 are synchronized. However, it is not always necessary to synchronize these switching timings. For example, the timing to switch the output voltage of the power supply circuit 41 may be slightly retarded from the timing to switch the output voltage of the power supply circuit 40. In addition, the timing to switch the output voltage of the power supply circuit 42 may be slightly retarded from the timing to switch the output voltage of the power supply circuit 40. Furthermore, the timing to switch the output voltage of the power supply circuit 42 may be slightly retarded from the timing to switch the output voltage of the power supply circuit 40.

In such a case, the operation may be modified from those of the fourth and fifth embodiments as follows. Hereinafter, the voltage that induces corona discharge between the first discharge electrode 20 and the reference electrode 30 is referred to as a first strong voltage. The voltage that does not induce the corona discharge between the first discharge electrode 20 and the reference electrode 30 is referred to as a first weak voltage.

The voltage that induces corona discharge between the second discharge electrode 21 and the control electrode 31 is referred to as a second strong voltage. The voltage that does not induce the corona discharge between the second discharge electrode 21 and the control electrode 31 is referred to as a second weak voltage.

The voltage that induces corona discharge between the third discharge electrode 22 and the control electrode 32 is referred to as a third strong voltage. The voltage that does not induce the corona discharge between the third discharge electrode 22 and the control electrode 32 is referred to as a third weak voltage.

In the entirety of a first period of time, the control unit 50 controls the output voltages of the power supply circuits 40, 41, 42 to the first weak voltage, the second weak voltage and the third weak voltage, respectively. In the entirety of a second period of time subsequent to the first period of time, the control unit 50 controls the output voltages of the power supply circuits 40, 41, 42 to the first strong voltage, the second weak voltage, and the third weak voltage, respectively. In the entirety of a third period of time subsequent to the second period of time, the control unit 50 controls the output voltages of the power supply circuits 40, 41, 42 to the first strong voltage, the second strong voltage, and the third weak voltage, respectively.

In the entirety of a fourth period of time subsequent to the third period of time, the control unit 50 controls the output voltages of the power supply circuits 40, 41, 42 to the first strong voltage, the second strong voltage, and the third strong voltage, respectively. In the entirety of a fifth period of time subsequent to the fourth period of time, the control unit 50 controls the output voltages of the power supply circuits 40, 41, 42 to the first weak voltage, the second strong voltage, and the third strong voltage, respectively.

In the entirety of a sixth period of time subsequent to the fifth period of time, the control unit 50 controls the output voltages of the power supply circuits 40, 41, 42 to the first weak voltage, the second weak voltage, and the third strong voltage, respectively. In the entirety of a seventh period of time subsequent to the sixth period of time, the control unit 50 controls the output voltages of the power supply circuits 40, 41, 42 to the first weak voltage, the second weak voltage, and the third weak voltage, respectively.

The control unit 50 controls the output voltage of the power supply circuit 42 to the third weak voltage, in a part of the periods of time in which the output voltage of the power supply circuit 41 is controlled to the second weak voltage (that is, in the first period of time, the second period of time and the seventh period of time among the first period of time, the second period of time, the sixth period of time and the seventh period of time). The control unit 50 controls the output voltage of the power supply circuit 42 to the third strong voltage, in a part of the periods of time in which the output voltage of the power supply circuit 41 is controlled to the second strong voltage (that is, in the fourth period of time and the fifth period of time among the third period of time, the fourth period of time and the fifth period of time).

The control unit 50 controls the output voltage of the power supply circuit 40 to the first weak voltage, in a part of the periods of time in which the output voltage of the power supply circuit 41 is controlled to the second weak voltage (that is, in the first period of time, the sixth period of time and the seventh period of time among the first period of time, the second period of time, the sixth period of time, and the seventh period of time). The control unit 50 controls the output voltage of the power supply circuit 40 to the first strong voltage, in a part of the periods of time in which the output voltage of the power supply circuit 41 is controlled to the second strong voltage (that is, in the third period of time and the fourth period of time among the third period of time, the fourth period of time and the fifth period of time).

As described above, the period of time in which the output voltage of the power supply circuit 40 is the first strong voltage and the period of time in which the output voltage of the power supply circuit 41 is the second strong voltage overlap with each other at least at a part. Also, the period of time in which the output voltage of the power supply circuit 40 is the first weak voltage and the period of time in which the output voltage of the power supply circuit 41 is the second weak voltage overlap with each other at least at a part. There are also true for the second embodiment.

As described above, the period of time in which the output voltage of the power supply circuit 41 is the second strong voltage and the period of time in which the output voltage of the power supply circuit 42 is the third strong voltage overlap with each other at least at a part. Also, the period of time in which the output voltage of the power supply circuit 41 is the second weak voltage and the period of time in which the output voltage of the power supply circuit 42 is the third weak voltage overlap with each other at least at a part.

As described above, the period of time in which the output voltage of the power supply circuit 40 is the first strong voltage and the period of time in which the output voltage of the power supply circuit 42 is the third strong voltage overlap with each other at least at a part. Also, the period of time in which the output voltage of the power supply circuit 40 is the first weak voltage and the period of time in which the output voltage of the power supply circuit 42 is the third weak voltage overlap with each other at least at a part.

(13) In each of the fourth and fifth embodiments described hereinabove, the electrode pairs are connected in series in three stages. As another example, the electrode pairs of more than four stages may be connected in series.

The present disclosure is not limited to the embodiments described hereinabove, but can be suitably modified. The embodiments described hereinabove are not irrelevant to each other, but can be suitably combined as long as those can be combined without discrepancy. In the embodiments described hereinabove, the number, the value, or the quantity of respective structural elements, and any numeric values such as the range of values are not limited to those described unless those are explicitly described as necessary or those need to be explicitly limited to specific values. In the embodiments described hereinabove, the material, the shape, or the positional relationship of respective structural elements is not limited to those described unless those are explicitly described or those need to be explicitly limited to the specific material, the shape or the positional relationship.

What is claimed is:

1. An ionic wind delivery device comprising:
   a first discharge electrode;
   a reference electrode that is arranged separate from the first discharge electrode;
   a first power supply circuit that is configured to output a voltage to induce a corona discharge between the first discharge electrode and the reference electrode;
   a control electrode that is arranged on a delivery path of an ionic wind of ions that are generated by the corona discharge induced between the first discharge electrode and the reference electrode;
   a second discharge electrode that is arranged between the reference electrode and the control electrode; and
   a second power supply circuit that is configured to output a voltage that accelerates the ions generated by the corona discharge induced between the first discharge electrode and the reference electrode and induces a corona discharge between the second discharge electrode and the control electrode, wherein
   the first power supply circuit and the second power supply circuit are configured to be controlled in such a manner that:
   the first power supply circuit is switched to output the voltage that induces the corona discharge between the first discharge electrode and the reference electrode and the second power supply circuit is switched to output the voltage that induces the corona discharge between the second discharge electrode and the control electrode, so that an ionic wind of ions that are generated by the corona discharge induced between the first discharge electrode and the reference electrode and the corona discharge induced between the second discharge electrode and the control electrode is emitted as a jet stream; and
   after the ionic wind is emitted, and before the second power supply circuit is switched again to output the voltage that induces the corona discharge between the second discharge electrode and the control electrode, the second power supply circuit is controlled to output a voltage so as to move ions present between the reference electrode and the control electrode toward the reference electrode.

2. The ionic wind delivery device according to claim 1, comprising:
   a case that accommodates at least the control electrode, and has a jet opening to emit the ionic wind of the ions generated by the corona discharge induced between the first discharge electrode and the reference electrode and the corona discharge induced between the second discharge electrode and the control electrode; and
   a control unit that is configured to switch an output voltage of the second power supply circuit between a voltage that prohibits the corona discharge between the second discharge electrode and the control electrode and the voltage that induces the corona discharge between the second discharge electrode and the control electrode.

3. The ionic wind delivery device according to claim 2, wherein
   the control unit controls the first power supply circuit to output a voltage that prohibits the corona discharge between the first discharge electrode and the reference electrode at least in a part of a period of time in which the output voltage of the second power supply circuit is controlled to the voltage that prohibits the corona discharge between the second discharge electrode and the control electrode, and
   the control unit controls the first power supply circuit to output the voltage that induces the corona discharge between the first discharge electrode and the reference electrode at least in a part of a period of time in which the output voltage of the second power supply circuit is controlled to the voltage that induces the corona discharge between the second discharge electrode and the control electrode.

4. The ionic wind delivery device according to claim 2, wherein
   the control unit switches an output voltage of the first power supply circuit to the voltage that induces the corona discharge between the first discharge electrode and the reference electrode and switches the output voltage of the second power supply circuit to the voltage that induces the coronal discharge between the second discharge electrode and the control electrode, so that the ionic wind of the ions generated by the corona discharge induced between the first discharge electrode and the reference electrode and the corona discharge induced between the second discharge electrode and the control electrode is emitted out from the jet opening as a jet stream, and
   after the ionic wind is emitted out from the jet opening, and before the control unit again controls the second power supply circuit to output the voltage that induces the corona discharge between the second discharge electrode and the control electrode, the control unit controls the second power supply circuit to output a voltage so as to move the ions present between the reference electrode and the control electrode toward the reference electrode.

5. The ionic wind delivery device according to claim 1, wherein
   the control electrode is referred to as a first control electrode,
   the ionic wind delivery device further comprising:
   a second control electrode that is arranged on a delivery path of the ionic wind of the ions generated by the corona discharge induced between the second discharge electrode and the first control electrode;
   a third discharge electrode that is arranged between the first control electrode and the second control electrode; and
   a third power supply circuit that is configured to output a voltage to accelerate ions generated by a corona discharge induced between the third discharge electrode and the second control electrode and to induce the corona discharge between the third discharge electrode and the second control electrode.

6. The ionic wind delivery device according to claim 5, further comprising:
- a case that accommodates at least the second control electrode, and has a jet opening to emit an ionic wind of the ions generated by the corona discharge induced between the first discharge electrode and the reference electrode, the corona discharge induced between the second discharge electrode and the first control electrode, and the corona discharge induced between the third discharge electrode and the second control electrode; and
- a control unit that is configured to switch an output voltage of the second power supply circuit between a voltage that prohibits the corona discharge between the second discharge electrode and the first control electrode and the voltage that induces the corona discharge between the second discharge electrode and the first control electrode, and to switch an output voltage of the third power supply circuit between a voltage that prohibits the corona discharge between the third discharge electrode and the second control electrode and a voltage that induces the corona discharge between the third discharge electrode and the second control electrode.

7. The ionic wind delivery device according to claim 6, wherein
the control unit controls the output voltage of the third power supply circuit to the voltage that prohibits the corona discharge between the third discharge electrode and the second control electrode at least in a part of a period of time in which the output voltage of the second power supply circuit is controlled to the voltage that prohibits the corona discharge between the second discharge electrode and the first control electrode, and
the control unit controls the output voltage of the third power supply circuit to the voltage that induces the corona discharge between the third discharge electrode and the second control electrode at least in a part of a period of time in which the output voltage of the second power supply circuit is controlled to the voltage that induces the corona discharge between the second discharge electrode and the first control electrode.

8. The ionic wind delivery device according to claim 7, wherein
the control unit further controls an output voltage of the first power supply circuit to a voltage that prohibits the corona discharge between the first discharge electrode and the reference electrode at least in the part of the period of time in which the output voltage of the second power supply circuit is controlled to the voltage that prohibits the corona discharge between the second discharge electrode and the control electrode, and
the control unit controls the output voltage of the first power supply circuit to the voltage that induces the corona discharge between the first discharge electrode and the reference electrode at least in the part of the period of time in which the output voltage of the second power supply circuit is controlled to the voltage that induces the corona discharge between the second discharge electrode and the control electrode.

9. The ionic wind delivery device according to claim 7, wherein
the control unit switches an output voltage of the first power supply circuit to the voltage that induces the corona discharge between the first discharge electrode and the reference electrode, switches the output voltage of the second power supply circuit to the voltage that induces the corona discharge between the second discharge electrode and the first control electrode, and switches the output voltage of the third power supply circuit to the voltage that induces the corona discharge between the third discharge electrode and the second control electrode, so that the ionic wind of the ions generated by the corona discharges induced between the first discharge electrode and the reference electrode, between the second discharge electrode and the first control electrode, and between the third discharge electrode and the second control electrode is emitted out from the jet opening as a jet stream, and after the ionic wind is emitted out from the jet opening, and before the control unit again controls the output voltage of the third power supply circuit to the voltage that induces the corona discharge between the third discharge electrode and the second control electrode, the control unit controls the third power supply circuit to output a voltage so as to move ions present between the first control electrode and the second control electrode toward the first control electrode, and the second power supply circuit to output a voltage so as to move ions present between the reference electrode and the first control electrode toward the reference electrode.

10. An ionic wind delivery device comprising:
a first discharge electrode;
a reference electrode that is arranged separate from the first discharge electrode;
a first power supply circuit that is configured to output a voltage to induce a corona discharge between the first discharge electrode and the reference electrode;
a first control electrode that is arranged on a delivery path of an ionic wind of ions that are generated by the corona discharge induced between the first discharge electrode and the reference electrode;
a second discharge electrode that is arranged between the reference electrode and the first control electrode;
a second power supply circuit that is configured to output a voltage that accelerates the ions generated by the corona discharge induced between the first discharge electrode and the reference electrode and induces a corona discharge between the second discharge electrode and the first control electrode;
a second control electrode that is arranged on a delivery path of an ionic wind of ions generated by the corona discharge induced between the second discharge electrode and the first control electrode;
a third discharge electrode that is arranged between the first control electrode and the second control electrode;
a third power supply circuit that is configured to output a voltage to accelerate ions generated by a corona discharge induced between the third discharge electrode and the second control electrode and to induce the corona discharge between the third discharge electrode and the second control electrode;
a case that accommodates at least the second control electrode, and has a jet opening to emit an ionic wind of the ions generated by the corona discharge induced between the first discharge electrode and the reference electrode, the corona discharge induced between the second discharge electrode and the first control electrode, and the corona discharge induced between the third discharge electrode and the second control electrode; and a control unit that is configured to switch an output voltage of the second power supply circuit between a voltage that prohibits the corona discharge between the second discharge electrode and the first control electrode and a voltage that induces the corona discharge between the second discharge electrode and the first control electrode, and to switch an output voltage of the third power supply circuit between a voltage that prohibits the corona discharge between the third discharge electrode and the second control electrode and a voltage that induces the corona discharge between the third discharge electrode and the second control electrode, wherein the control unit controls the output voltage of the third power supply circuit to the voltage that prohibits the corona discharge between the third discharge electrode and the second control electrode at least in a part of a period of time in which the output voltage of the second power supply circuit is controlled to the voltage that prohibits the corona discharge between the second discharge electrode and the first control electrode, the control unit controls the output voltage of the third power supply circuit to the voltage that induces the corona discharge between the third discharge electrode and the second control electrode at least in a part of a period of time in which the output voltage of the second power supply circuit is controlled to the voltage that induces the corona discharge between the second discharge electrode and the first control electrode, the control unit switches an output voltage of the first power supply circuit to a voltage that induces the corona discharge between the first discharge electrode and the reference electrode, switches the output voltage of the second power supply circuit to the voltage that induces the corona discharge between the second discharge electrode and the first control electrode, and switches the output voltage of the third power supply circuit to the voltage that induces the corona discharge between the third discharge electrode and the second control electrode, so that an ionic wind of the ions generated by the corona discharges induced between the first discharge electrode and the reference electrode, between the second discharge electrode and the first control electrode, and between the third discharge electrode and the second control electrode is emitted out from the jet opening as a jet stream, and after the ionic wind is emitted out from the jet opening, and before the control unit again controls the output voltage of the third power supply circuit to the voltage that induces the corona discharge between the third discharge electrode and the second control electrode, the control unit controls the third power supply circuit to output a voltage so as to move ions present between the first control electrode and the second control electrode toward the first control electrode, and the second power supply circuit to output a voltage so as to move ions present between the reference electrode and the first control electrode toward the reference electrode.

11. The ionic wind delivery device according to claim 10, wherein the control unit further controls the output voltage of the first power supply circuit to a voltage that prohibits the corona discharge between the first discharge electrode and the reference electrode at least in the part of the period of time in which the output voltage of the second power supply circuit is controlled to the voltage that prohibits the corona discharge between the second discharge electrode and the control electrode, and the control unit controls the output voltage of the first power supply circuit to the voltage that induces the corona discharge between the first discharge electrode and the reference electrode at least in the part of the period of time in which the output voltage of the second power supply circuit is controlled to the voltage that induces the corona discharge between the second discharge electrode and the control electrode.

\* \* \* \* \*